3,054,827
PRODUCTION OF NITROHYDROCARBONS

Gustave B. Bachman, Lafayette, Ind., and Gerald C. Goldfinger, Cincinnati, Ohio, assignors to Purdue Research Foundation, West Lafayette, Ind., a corporation of Indiana
No Drawing. Filed Oct. 26, 1959, Ser. No. 848,552
17 Claims. (Cl. 260—644)

Our invention relates to the production of nitrohydrocarbons. More particularly it relates to the production of nitrohydrocarbons by the action of dinitrogen tetroxide upon metal carboxylates.

Since the lower nitroalkanes first become commercially available in 1940, the nitrohydrocarbons have become increasingly important as a new class of chemical compounds used as a starting material in the production of a wide variety of compounds. The lower aliphatic nitroalkanes are readily obtained by the vapor phase nitration of alkanes. There has, however, previously been no readily available method of producing other than the lower nitroalkanes. We have now discovered a practical method whereby good yields of nitrohydrocarbons and particularly nitrohydrocarbons other than the lower nitroalkanes can be obtained by treating certain metal carboxylates with dinitrogen tetroxide. The mechanism whereby the nitrohydrocarbon is thus produced is not definitely known. It appears probable, however, that the action of the dinitrogen tetroxide on the metal carboxylate first produces a complex metal salt which pyrolyzes or hydrolyzes to give a mixture of the corresponding nitrohydrocarbon and free acid; as for example, 1-nitropentane and caproic acid by the action of dinitrogen tetroxide upon silver caproate. It is distinctly understood, however, that we are not limited to any particular theory of the mechanism whereby our reaction takes place.

Our new process is applicable to the production of a wide range of nitrohydrocarbons including aliphatic, cycloaliphatic, and aromatic nitrohydrocarbons. In addition primary, secondary and tertiary nitrohydrocarbons as well as dinitrohydrocarbons can be produced by our new process. It is particularly applicable to the production of higher aliphatic nitrohydrocarbons which cannot be readily produced by previously available processes.

Our process consists essentially of treating at elevated temperatures with dinitrogen tetroxide metal carboxylates of the character represented by the following structural formula:

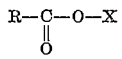

wherein X is selected from the group consisting of Ag (I) and Hg (II) and where R is a radical selected from the group consisting of aliphatic, cycloaliphatic and aromatic. Compounds of this type which we can use in our process include but are not limited to the following: silver and mercuric salts of caproic acid, isobutyric acid, pivalic acid, stearic acid, adipic acid, ethyl malonic acid, benzoic acid, cinnamic acid, cyclohexanoic acid, and the like.

Treatment of a metal salt of the above type with dinitrogen tetroxide at temperatures from slightly above room temperature to temperatures of the order of 150° C. give the corresponding nitrohydrocarbon, together with the free acid of the salt used. The upper temperature employed is usually dependent to some extent upon the conditions under which the reaction is carried out, the reaction being generally preferably effected in the presence of a suitable inert solvent. Where such a solvent is used, the temperature at which the reaction is carried out is obviously affected by the boiling point of the particular solvent used. In general, the reaction is satisfactorily carried out at temperatures ranging from 20–100° C. For most purposes, a temperature range of 70–80° C. has been found to be satisfactory.

The solvent employed is for the purpose of effecting uniform distribution of the reactants and for the purpose of assisting in the dissipation of the heat of reaction. Solvents which we have found to be satisfactory include the halogenated hydrocarbons such as chloroform, carbon tetrachloride, dichlorethylene, etc. Whatever solvent used should be inert to dinitrogen tetroxide and to halogens when halogens are used in the reaction as outlined below, and to nitryl chloride when the latter is employed as the active reacting agent. Where a halogen is used in the process, the use of a halogenated solvent is particularly desirable due to the fact that halogens react at least to some extent with many common solvents.

We have found that the presence of a halogen such as bromine, iodine, and chlorine in the reaction mixture markedly increases the yields of both the nitrohydrocarbon and the corresponding acid. Since nitryl chloride readily decomposes into dinitrogen tetroxide and chlorine under the conditions of the reaction, we regard the use of nitryl chloride as an equivalent of mixtures of dinitrogen tetroxide and chlorine. Since nitryl bromide and nitryl iodide are not readily prepared, we do not contemplate their use in our process.

In general, essentially the same reaction products and the same yields thereof are obtained regardless of the order of making the reactants. While in most cases the dinitrogen tetroxide and halogen were added to the solution of metal carboxylate, in some instances the addition of the metal carboxylate to the dinitrogen tetroxide-halogen solution gave somewhat better yields.

When using dinitrogen tetroxide or nitryl chloride as the nitrating agent, we have found that satisfactory results are usually obtained when using either approximately stoichiometric proportions or an excess of the nitrating compound. If, however, a halogen is used with the nitrating agent we have found that satisfactory results are obtained if stoichiometric proportions of the metal carboxylate and nitrating agent are used, although almost equally satisfactory results have been obtained when using amounts of nitrating agent as low as one-half stoichiometric proportions. The amount of halogen used with the nitrating agent can range from one-half to equal stoichiometric proportions with almost equally satisfactory results.

We have found that more satisfactory results are obtained if both the reactants and the solvent are maintained as nearly anhydrous as possible.

The metal carboxylates used in our process can be prepared in any suitable manner. A satisfactory method is illustrated by the following procedure for the production of silver caproate. A solution of 54 ml. (0.82 mole) of concentrated ammonium hydroxide in 100 ml. of distilled water was stirred into a three liter beaker which contained 95.2 g. (0.82 mole) of caproic acid dissolved in 200 ml. of methanol. A solution of 139 g. (0.82 mole) of silver nitrate in 200 ml. of distilled water was introduced slowly with vigorous stirring. A white precipitate formed immediately. It was necessary to add more distilled water, as the silver nitrate was added, to facilitate stirring. The reaction mixture was allowed to cool to room temperature with stirring after all of the silver nitrate had been added. The precipitate was filtered and washed with about 500 ml. of distilled water, transferred to a three liter beaker, and stirred with about 500 ml. of acetone. This mixture was filtered and the solid washed with about 750 ml. of acetone. The silver caproate was dried in a vacuum dessicator to constant weight at 1 mm. pressure over phosphorus pentoxide, yielding 159 g. of silver caproate.

The dinitrogen tetroxide used was preferably first dried by passage through a drying train containing phosphorus pentoxide and magnesium perchlorate and then liquefied.

The inert solvent used in the process, such as carbon tetrachloride, was distilled from phosphorus pentoxide, into a bottle containing phosphorus pentoxide.

The dry dinitrogen tetroxide was then dissolved in the dry inert solvent such as dry carbon tetrachloride with the required amount of halogen, such as bromine and the resulting solution then dried over phosphorus pentoxide. To this solution was then added the required amount of dry metal carboxylate or, if preferred, the above solution can be added to a suitable vessel containing the dry metal carboxylate.

According to another modification, the dry metal carboxylate can be placed in a three-necked flask fitted with a dropping funnel, stirrer, and a water condenser attached to a sulfuric acid and drying tower. The dry inert solvent was then added to the metal carboxylate and the dry dinitrogen tetroxide and dry halogen then added dropwise. The resulting mixture was then stirred for approximately one hour, heated to reflux temperature, held at the latter temperature for approximately two hours and then filtered. The isolated solid was washed with carbon tetrachloride and the filtrate washed with 100 ml. each of 10% urea solution and 10% sodium sulfite solution, followed by two 100 ml. portions of 10% sodium carbonate solution. The aqueous layers from the last two washings were acidified with concentrated hydrochloric acid and extracted with three portions of 75 ml. each of ethyl ether. The ether layer was dried over calcium chloride and distilled. The resulting carboxylic acid was isolated.

When iodine is used as the halogen, it is added as a solid and the dinitrogen tetroxide is then added in solution form.

Table I shows the results of a series of experiments in which thoroughly dried silver caproate was placed in a three-necked flask and 200 ml. of dry carbon tetrachloride then added. The remaining indicated reactants were then added as rapidly as possible and the resulting mixture was then stirred for about one hour, heated to reflux temperature, held at this temperature and filtered. The reaction product was then treated as described above. The results are shown in Table I.

*Table I*

| Reactants a | | | Yields of Products | | | | |
|---|---|---|---|---|---|---|---|
| Silver Caproate, g. (mole) | Nitrating b Cmpd., g. (mole) | Halogen c g. (mole) | 1-nitropentane, percent | Caproic Acid, percent | Silver Halide (mole) | Unidentified, g. | Alkyl Halide |
| 44 (0.2) | 38 (0.40) | none | 4 | 62 | d 0.19 | none | none |
| 44 (0.2) | large excess.e | | 14 | 50 | 0.13 | none | none |
| 66 (0.3) | 13 (0.15) | f 38 (0.15) | 13 | 72 | 0.25 | 2.1 | Trace |
| 88 (0.4) | 19 (0.20) | 32 (0.20) | 24 | 55 | 0.38 | 0.9 | Trace |
| 66 (0.3) | 13 (0.15) | 48 (0.30) | 28 | 51 | 0.27 | 2.8 | 9% |
| 66 (0.3) | 26 (0.30) | 24 (0.15) | 25 | 44 | 0.30 | 2.5 | Trace |
| 66 (0.3) | 13 (0.15) | g 24 (0.15) | 28 | 49 | 0.16 | 1.5 | Trace |
| 66 (0.3) | 13 (0.15) | h 11 (0.15) | 10 | 60 | 0.25 | 2.0 | Trace | a About 200 ml. of carbon tetrachloride was added to the salt. The other reactants were added as carbon tetrachloride solutions unless otherwise indicated.
b The nitrating compound was dinitrogen tetroxide unless otherwise indicated.
c The halogen was bromine, unless otherwise indicated.
d Silver nitrite.
e Nitryl chloride.
f Iodine. The iodine was added as a solid. The dinitrogen tetroxide was added as a carbon tetrachloride solution.
g Inverse addition; the salt was added to the other reactants.
h Chlorine.

Under conditions similar to those described above, 0.3 mole mercuric caproate, 0.15 mole nitrogen tetroxide and 0.15 mole bromine was refluxed for three hours. The resulting yield of 1-nitropentane was 25%.

A similar series of experiments was carried out as described above using silver salts of different carboxylic acids. The results of this series of experiments are shown in Table II above.

*Table II*

| Reactants | | | Products | |
|---|---|---|---|---|
| Silver Salt, g. (mole) | Dinitrogen Tetroxide, g. (mole) | Bromine, g. (mole) | Nitro Compound | Yield, Percent |
| Caproate 88 (0.4) | 19 (0.20) | 32 (0.20) | 1-nitropentane. | 24 |
| Isobutyrate 78 (0.4) | 19 (0.2) | 32 (0.2) | 2-nitropropane. | 20 |
| Pivalate 81.5 (0.4) | 19 (0.2) | 32 (0.2) | tert-nitrobutane. | 20 |
| Cyclohexanoate 94 (0.4) | 19 (0.2) | 32 (0.2) | nitrocyclohexane. | 23 |
| Adipate 144 (0.4) | 38 (0.4) | 64 (0.4) | 2,4-dinitrobutane. | 10 |
| Ethylmalonate 138 (0.4) | 38 (0.4) | 64 (0.4) | 1,1-dinitropropane. | 4 |
| Cinnamate 102 (0.4) | 19 (0.2) | 64 (0.2) | β-nitrostyrene. | 25 |
| Benzoate 92 (0.4) | 19 (0.2) | 64 (0.2) | Nitrobenzene. | 4 |

Now having described our invention, what we claim is:

1. In a process for the production of nitrohydrocarbons, the step which comprises reacting dinitrogen tetroxide at temperatures from room temperature to 150° C. with a compound having the structural formula $$R-\underset{\underset{O}{\parallel}}{C}-O-X$$

wherein X is selected from the group consisting of Ag (I) and Hg (II), and R is selected from the group of hydrocarbon radicals consisting of aliphatic, cycloaliphatic and aromatic, the said hydrocarbon radical containing not more than 17 carbon atoms.

2. The process of claim 1 wherein the temperature ranges from 20° to 100° C.

3. The process of claim 1 wherein the reactants are contacted in an inert solvent medium.

4. The process of claim 1 wherein R is an aliphatic radical the said radical containing not more than 17 carbon atoms.

5. The process of claim 1 wherein the radical R is a cycloaliphatic radical the said radical containing not more than 17 carbon atoms.

6. The process of claim 1 wherein R is an aromatic radical the said radical containing not more than 17 carbon atoms.

7. The process of claim 1 wherein X is Ag (I).

8. The process of claim 1 wherein X is Hg (II).

9. The process of preparing 1-nitropentane which comprises reacting silver caproate with dinitrogen tetroxide at a temperature of about 20–100° C.

10. The process of preparing 2-nitropropane which comprises reacting silver isobutyrate with dinitrogen tetroxide at a temperature of about 20–100° C.

11. The process of preparing tert-nitrobutane which comprises reacting silver pivalate with dinitrogen tetroxide at a temperature of about 20–100° C.

12. The process of preparing nitrocyclohexane which comprises reacting silver cyclohexanoate with dinitrogen tetroxide at a temperature of about 20–100° C.

13. The process of preparing β-nitrostyrene which comprises reacting silver cinnamate with dinitrogen tetroxide at a temperature of about 20–100° C.

14. In a process for the production of a nitrohydrocarbon, the step which consists of reacting dinitrogen tetroxide and a halogen selected from the group consisting of chlorine, bromine and iodine with a compound having the structural formula:

$$R-\underset{\underset{O}{\|}}{C}-O-X$$

wherein X is selected from the group consisting of Ag (I) and Hg (II), and R is a hydrocarbon radical selected from the group consisting of aliphatic, cycloaliphatic and aromatic, the said hydrocarbon radical containing not more than 17 carbon atoms.

15. The process of claim 14 wherein the halogen is chlorine.

16. The process of claim 14 wherein the halogen is bromine.

17. The process of claim 14 wherein the halogen is iodine.

No references cited.